Figure 1:
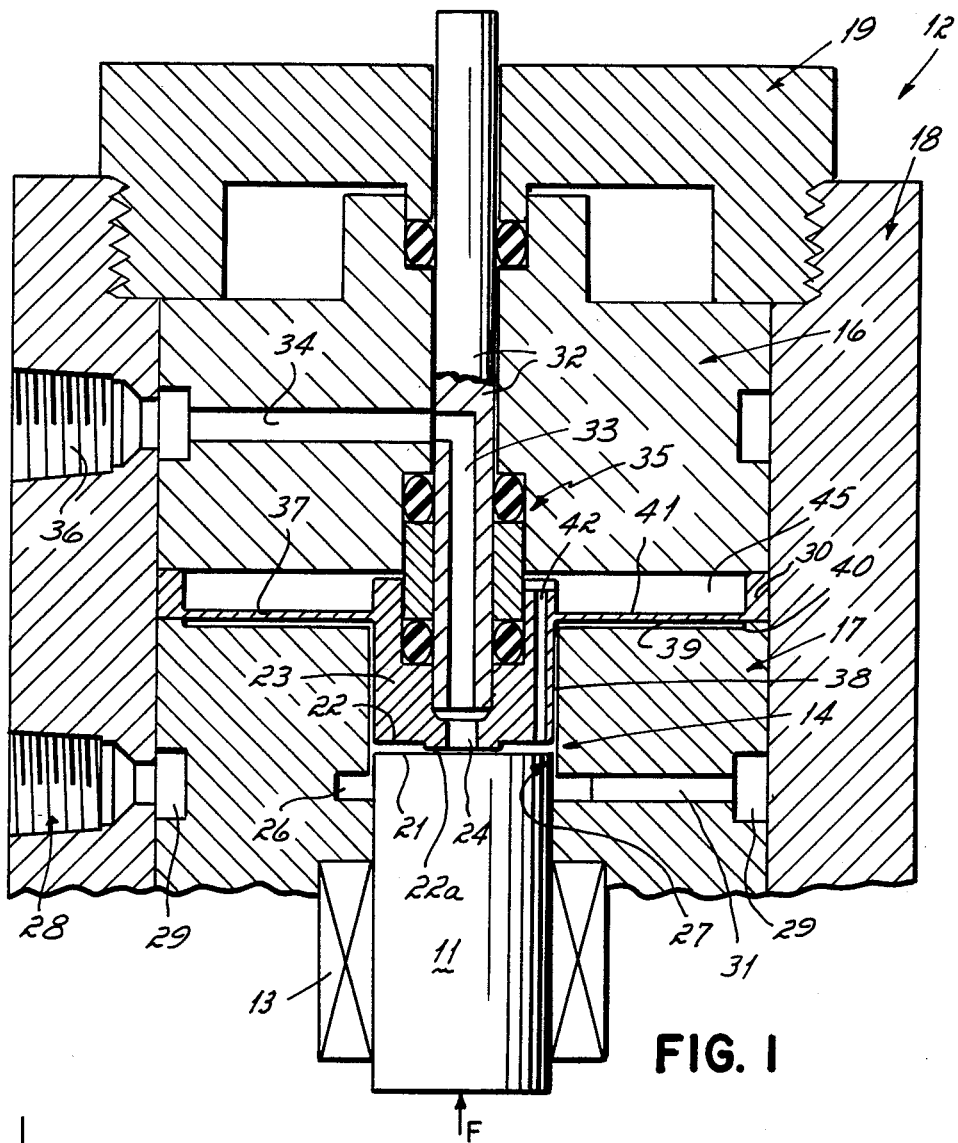

United States Patent [19]

Sixsmith

[11] Patent Number: 4,557,611
[45] Date of Patent: Dec. 10, 1985

[54] GAS THRUST BEARING

[75] Inventor: Herbert Sixsmith, Norwich, Vt.

[73] Assignee: Creare Research & Development Inc., Hanover, N.H.

[21] Appl. No.: 640,148

[22] Filed: Aug. 10, 1984

[51] Int. Cl.$^4$ .......................... F16C 17/04; F16C 32/06
[52] U.S. Cl. ........................................ 384/124; 384/215
[58] Field of Search ................ 384/99, 100, 103, 104, 384/105, 106, 121, 124, 125, 215

[56] References Cited
U.S. PATENT DOCUMENTS
3,799,630  3/1974  Chisholm ............................ 384/125

Primary Examiner—Donald Watkins
Assistant Examiner—David Werner
Attorney, Agent, or Firm—Wood, Herron & Evans

[57] ABSTRACT

A gas thrust bearing for a shaft mounted for rotation and limited axial movement in a housing. As disclosed, the axial shaft load is supported by pressurized gas between an end of the shaft serving as a first thrust surface and a cylindrical thrust pad providing a second thrust surface having an outlet orifice at its center. Pressurized gas is introduced between the shaft and the housing and flows between the thrust surfaces to the outlet orifice. The outlet orifice is surrounded by a small raised annulus. The thrust pad carrying the second thrust surface is supported on a flexible diaphragm which moves in response to changes in the thrust load in a manner to damp out oscillations of the shaft.

10 Claims, 2 Drawing Figures

GAS THRUST BEARING

DESCRIPTION OF THE INVENTION

This invention relates generally to gas lubricated bearings and more particularly concerns a gas thrust bearing for a shaft mounted for rotation and limited axial movement in a housing.

Gas lubricated thrust bearings may be divided into two broad categories depending upon whether they are self-acting or externally pressurized. In self-acting bearings, the load carrying capacity is proportional to the speed of the shaft. In externally pressurized bearings, the load carrying capacity is proportional to the supply pressure. The absence of a dependence of the load carrying capacity upon the speed of the shaft is a great advantage because high loads can be accommodated at low speeds.

Practical types of present externally pressurized thrust bearings are typically either pocketed bearings or plain orifice feed bearings. In a pocketed bearing, each pocket in a thrust pad is fed with gas under pressure through a small orifice. The design choice for such a bearing is between increasing the pocket area to increase the stiffness of the bearing and its load capacity and reducing the volume of the pocket to decrease the tendency toward pneumatic hammer. The load carrying capacity per unit area of thrust surface in such bearings reaches a limit of about half the supply pressure in the case of pocketed thrust bearings or about one third the supply pressure in the case of plain orifice thrust bearings. In both types, damping against pneumatic hammer is provided by squeeze film effects, and there is a critical film thickness above which pneumatic hammer tends to occur.

It is the general aim of the present invention to provide a pressurized gas lubricated thrust bearing which has a greater load bearing capacity than existing types of such bearings, for a given supply pressure, with improved stability to avoid pneumatic hammer.

The invention may find advantageous use in a variety of applications. One such application, for example, is in the area of cryogenic turbo-expanders. In such cryogenic turboexpanders, the axial load on the shaft usually depends upon pressures within the system, with the contributions due to the weight of the shaft being relatively small. The thrust loads due to system pressures, however, may be so high that they can exceed the limit of the capacity of conventional gas thrust bearings. The thrust bearing must be designed so that it will withstand loads resulting from steady system pressures as well as those which can occur as a result of sudden changes in pressure within the system. Because of the limited capacities of conventional thrust bearings, and the range of loads which may be experienced during operation, it is frequently necessary in such turbo-expanders to supply pressure controllers within the system to prevent overloads to the bearings.

In the embodiment of the invention to be described in more detail hereinafter, an improved gas lubricated thrust bearing for applications such as the above takes the form of a pressurized gap between an end of the shaft and a cylindrical thrust pad having an outlet orifice at its center. The outlet orifice is surrounded by a small raised annulus. A small clearance between the shaft and the shaft housing provides an inlet annulus which acts as a flow restrictor to limit the supply of pressurized gas to the pressurized gap of the thrust bearing.

The thrust pad is supported partially in the shaft bore on a flexible diaphragm which is designed to move in response to changes in the thrust load in such a manner that oscillations of the shaft are damped out. A narrow annular channel between a cylindrical perimeter surface of the thrust pad and the wall of the shaft bore acts as a fluid resistor. This provides a resistance to gas flow between the thrust annulus and the front face of the diaphragm carrying the thrust pad.

The annular clearance between the diaphragm and the housing provides a small volume of gas, which varies slightly dependent upon gas flow through the narrow annular channel. The product of this volume and the fluid resistance of the annular clearance represents a relaxation time. Ideally, this time is comparable with the inverse of the angular frequency of oscillation of the shaft, but in practice, its value is not critical.

A cavity with a much larger volume is provided on the other side of the diaphragm. A small bore through the thrust pad communicates between this larger cavity and the pressurized gap of the thrust bearing, serving as a restricted flow path. The relaxation time represented by the product of this larger volume on the back of the diaphragm and the fluid resistance of the bore through the thrust pad should be much larger than the relaxation time of the smaller front volume and the flow resistance of the annular clearance around the thrust pad.

The purpose of the bore through the thrust pad is to equalize the average pressures on the front and back surfaces of the diaphragm in order to avoid the imposition of large steady state loads on the diaphragm. This permits the use of a more flexible diaphragm, which provides a greater range of stable operation. A thrust bearing constructed in accordance with the present invention has a load carrying capacity of up to 95% of the gas supply pressure and is stable over a wide range of loads.

Figure 2:
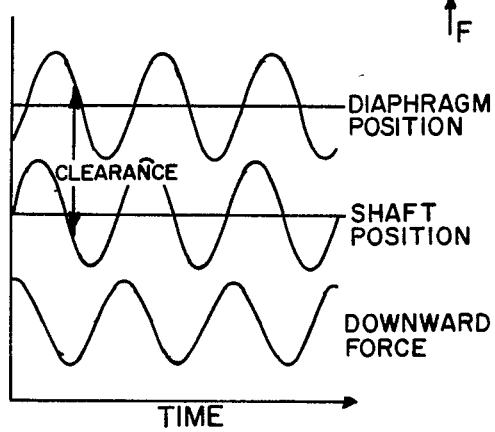

The manner in which this stability is assured shall become apparent upon reading the following detailed description of an exemplary embodiment of the invention and upon reference to the drawings, in which:

FIG. 1 is a cross-sectional view of a gas lubricated thrust bearing constructed in accordance with the present invention; and FIG. 2 is a diagrammatic illustration of the relationships between the diaphragm and shaft positions and the force generated in the thrust bearing, shown on a common time axis.

While the invention is susceptible to various modifications and alternative forms, a specific embodiment thereof has been shown by way of example in the drawings and will herein be described in detail. It should be understood, however, that it is not intended to limit the invention to the particular form disclosed, but, on the contrary, the intention is to cover all modifications, equivalents, and alternatives falling within the spirit and scope of the invention as defined by the appended claims.

With initial reference to FIG. 1, a shaft 11 is rotatably mounted in a housing 12 on suitable journal bearings 13. The journal bearings 13 may take the form of gas lubricated bearings, for example, but the particular type of journal bearings is not critical to the present invention. The shaft 11 is supported in the housing for limited axial movement under the influence of a load force F by a gas lubricated thrust bearing 14. The housing 12 receiving the shaft 11 includes two generally cylindrical interior housing elements 16, 17 secured within an outer annular housing element 18 by a threaded ring 19.

The axial shaft load is supported by pressurized gas between a first thrust surface 21 on the upper end of the shaft 11 and a second thrust surface 22 on a generally cylindrical thrust pad 23 having an outlet orifice 24 at its center. The outlet orifice 24 is surrounded by a small raised annulus 22a, forming a part of the second thrust surface 22.

Pressurized gas is supplied to the thrust bearing 14 from an annulus 26 in the housing element 17 through a small clearance 27 between the shaft 11 and the housing element 17. The pressurized gas is coupled to the annulus 26 from a supply of pressurized gas through a gas inlet 28, an annulus 29 formed in the outer wall of the housing element 17 and one or more passages 31 through the element 17 communicating between the outer annulus 29 and the inner annulus 26.

The gas flowing through the clearance seal 27 maintains a gap between the thrust surfaces 21, 22 and is exhausted through the orifice 24 in the thrust pad 23. A pin 32 carried within a suitable seal assembly 35 on the thrust pad 23 contains an exhaust passage 33 communicating between the orifice 24 and an exhaust channel 34 in the housing element 16. The gas flowing through the thrust bearing 14 is exhausted through the orifice 24, the path 33, and the channel 34 to an exhaust port, such as 36 for venting to the atmosphere or for recirculation to the gas supply.

The thrust pad 23 is supported on a flexible diaphragm 37 having an annular shoulder 30 secured between the housing elements 16, 17 within the housing element 18. The diaphragm 37 moves in response to changes in the thrust load at the bearing 14 in such a manner that axial oscillations of the shaft are damped out. To accomplish this, a narrow annular channel 38 between the outer cylindrical surface of the thrust pad 23 and the housing element 17 acts as a fluid resistor permitting restricted flow of thrust bearing gas between (a) the gap between the thrust surfaces 21, 22 and (b) the front face 39 of the diaphragm 37. The annular clearance 40 between the front face 39 of the diaphragm and the housing element 17 provides a small volume $V_1$, which varies slightly with movement of the thrust pad 23 and the diaphragm 37.

The product of this volume $V_1$ and the fluid resistance of the annular clearance 38 represents a relaxation time. This relaxation time is preferably comparable with the inverse of the angular frequency of oscillation of the shaft in order to provide optimum damping. In practice, the precise value of this relaxation time is not critical.

A cavity 45 with a much larger volume $V_2$ is provided between the back face 41 of the diaphragm 37 and the housing element 16. A small bore 42 through the thrust pad 23 provides a restricted flow path between the cavity 45 and the thrust bearing 14. The relaxation time represented by the product of this volume $V_2$ in the cavity 45 and the fluid resistance of the bore 42 should be much larger than the relaxation time of the volume $V_1$ of the cavity 40 and the flow resistance of the annulus 38. The bore 42 serves to equalize the average pressures on the front and back surfaces of the diaphragm 37, avoiding the imposition of large steady state pressure loads on the diaphragm during operation, and permitting the use of a more flexible diaphragm.

With additional reference now to FIG. 2, the manner of accomplishing the improved stability of the illustrated thrust bearing shall be described with regard to a condition in which the shaft 11 is oscillating axially. If the shaft 11 is oscillating, the cyclic variation in the area of the flow path surrounding the outlet orifice 24 causes a cyclic variation in pressure at the thrust bearing 14 and the corresponding force acting on the shaft.

When the shaft has reached the upper limit of its travel, the thrust pressure is above average. Consequently, at this time, the diaphragm is receding and the thrust pressure is falling. The pressure and the corresponding thrust reach their maximum in each cycle before the shaft reaches the upper limit of its stroke. Similarly, when the shaft has reached the lower limit of its stroke, the pressure is below average. At this time, the diaphragm is approaching the shaft, and the thrust pressure and force are rising. The pressure and the corresponding thrust reach their minimum in each cycle before the shaft reaches the lower limit of its stroke.

As a result of the described timing of the application of the thrust bearing force, the average thrust bearing force during the upward half of a cycle of axial motion of the shaft is greater than the average thrust force during the downward half cycle of motion. The difference between these average forces represents a damping force which acts in opposition to the upward and downward motion of the shaft. This damping force causes axial oscillation of the shaft to die out, thereby insuring stability.

The stability of the bearing will depend upon the supply pressure, the stiffness of the diaphragm, the volumes $V_1$ and $V_2$, and the flow resistances of the paths 38, 42. In the typical application, the thrust bearing must support the load and remain stable. So far as applicant is presently aware, the design parameters to accomplish such operation with the presently described bearing are not critical. In one form of bearing such as described herein, for a gas supply pressure of 90 psig, the bearing was stable from an applied load (force per unit area) on the shaft of about 18 psig to about 89 psig, where touchdown occurred. With a reduced supply pressure of 50 psig, the bearing was stable from zero load to maximum load capacity of about 49 psig.

Preferably, the bearing pad 23 and diaphragm 37 are integrally formed as a single thrust element and may be, for example, bronze, stainless steel, or beryllium-copper. In one form of thrust element constructed, the bore 42 through the bearing pad had a 0.020 inch diameter and the cavity 45 had an inside diameter of 0.375 inches, an outside diameter of 1.150 inches, and a depth of 0.090 inches. In a thrust bearing utilizing this thrust element, the thrust pad had a diameter of 0.373 inches and the housing bore receiving the thrust pad had a diameter of 0.375 inches, producing an annular channel 38 having a width of about 0.001 inches. The depth of the cavity 40 was about 0.003 inches, and its inside and outside diameters were substantially the same as those of the cavity 45.

I claim:

1. A thrust bearing for a shaft mounted in a housing for rotation and limited axial movement, comprising:
   a first thrust surface carried by the shaft;
   a thrust element having (a) a bearing pad which includes a second thrust surface and (b) a diaphragm portion secured to the housing and supporting the bearing pad to position the second thrust surface in opposition to the first thrust surface, the diaphragm having a front face which faces the second thrust surface;

means for coupling pressurized gas between the thrust surfaces to produce a gap therebetween; and means for forming a restricted flow path for pressurized gas between the gap and the front face of the diaphragm, the diaphragm being responsive to variations in pressure applied to its front face to move the bearing pad and the second thrust surface, whereby pressure variations in the gap produced by axial movement of the shaft are coupled through the restricted flow path to vary the pressure applied to the front face of the diaphragm, effecting movement of the second thrust surface which lags the shaft movement to thereby damp oscillations of the shaft.

2. The thrust bearing of claim 1 in which the bearing pad of the thrust element is received for limited translation in a bore in the housing and the means for forming a restricted flow path comprises a clearance between the bearing pad and the housing within the bore.

3. The thrust bearing of claim 2 in which the shaft is mounted in the bore receiving the bearing pad, and the first thrust surface carried by the shaft comprises an end of the shaft adjacent the bearing pad.

4. The thrust bearing of claim 3 in which the bearing pad is generally cylindrical and the clearance between the bearing pad and the housing in the bore is an annular clearance.

5. A thrust bearing for a shaft mounted in a bore in a housing for rotation and limited axial movement, comprising:

a first thrust surface on an end of the shaft;

a thrust element having (a) a bearing pad, at least partially received in the shaft bore, including a second thrust surface having an opening therein and (b) a diaphragm portion secured to the housing and supporting the bearing pad for limited axial movement to position the second thrust surface in opposition to the first thrust surface on the end of the shaft, the diaphragm having a front face which faces the first and second thrust surfaces and being responsive to variations in pressure applied to the front face to move the bearing pad and the second thrust surface; and means for coupling pressurized gas between the thrust surfaces to produce a gap therebetween, the bearing pad including an exhaust channel communicating between the opening in the second thrust surface and a gas exhaust passageway in the housing, and the clearance in the bore between the bearing pad and the housing defining a restricted flow path for pressurized gas between the gap and the front face of the diaphragm, whereby pressure variations in the gap produced by axial movement of the shaft are coupled through the restricted flow path to vary the pressure applied to the front face of the diaphragm, effecting movement of the second thrust surface which lags the shaft movement to thereby damp oscillations of the shaft.

6. The thrust bearing of claim 5 in which the means for coupling pressurized gas between the thrust surfaces comprises means for coupling pressurized gas around the shaft near the end of the shaft serving as the first thrust surface, a clearance between the shaft and the housing in the shaft bore providing a flow path for pressurized gas to the gap between the thrust surfaces.

7. The thrust bearing of claim 6 in which the diaphragm has a back face and the bearing pad further includes a bore therethrough permitting restricted gas flow between the gap and the back face of the diaphragm.

8. The thrust bearing of claim 7 in which the resistance to gas flow through the bore in the bearing pad is greater than the resistance to gas flow through the clearance around the bearing pad in the bore.

9. A thrust bearing for a shaft mounted in a housing for rotation and limited axial movement, comprising:

a first thrust surface carried by the shaft;

means for positioning a second thrust surface in opposition to the first thrust surface;

means for coupling pressurized gas between the thrust surfaces to produce a gap therebetween, said positioning means being responsive to variations in an applied pressure to effect limited movement of the second thrust surface tending to vary the gap between the thrust surfaces; and means for forming a restricted flow path for pressurized gas from the gap to said positioning means, whereby pressure variations in the gap produced by axial movement of the shaft are coupled through the restricted flow path to vary the pressure applied to said positioning means to thereby effect movement of the second thrust surface which lags shaft movement, damping oscillations of the shaft.

10. The thrust bearing of claim 9 in which the first thrust surface is on an end of the shaft adjacent the second thrust surface.

* * * * *